United States Patent [19]

Waldrum

[11] Patent Number: 4,892,255

[45] Date of Patent: Jan. 9, 1990

[54] CENTRIFUGAL APPLICATING DEVICE

[76] Inventor: John E. Waldrum, 349 Fairview Ave., Ambler, Pa. 19002

[21] Appl. No.: 258,186

[22] Filed: Oct. 14, 1988

[51] Int. Cl.⁴ .......................... A01C 19/00; B64D 1/18
[52] U.S. Cl. .................................... 239/682; 239/684; 239/171
[58] Field of Search ............... 239/171, 681, 684, 687, 239/688, 682; 244/136

[56] References Cited

U.S. PATENT DOCUMENTS

| | | | |
|---|---|---|---|
| 396,251 | 1/1889 | Adamson | 239/680 X |
| 1,761,889 | 6/1930 | Junkers | 244/136 |
| 2,726,089 | 12/1955 | Baker | 239/687 R |
| 3,533,582 | 10/1970 | Roth | 294/136 |
| 3,968,933 | 7/1976 | Waldrum | 239/171 |
| 4,453,675 | 6/1984 | Kadadk et al. | 239/171 |

FOREIGN PATENT DOCUMENTS 74155  3/1983  European Pat. Off. ............ 239/682

Primary Examiner—Andres Kashnikow
Assistant Examiner—Kevin P. Weldon
Attorney, Agent, or Firm—Steele, Gould & Fried

[57] ABSTRACT

A centrifugal applicating device is disclosed which is hingedly connected below the product reservoir of an agricultural spray aircraft. The device includes an upper plate having a pair of feed openings and a pair of star wheel applicators rotatively carried by the upper plate below the feed openings. Each star wheel applicator includes a plurality of hollow nozzles in fluid communication with the feed openings to receive measured portions of granular agricultural materials. Each nozzle is formed with an enlarged, planar paddle on one side in position to be impinged by wind forces to rotate the star wheel applicators as the aircraft flies. A synchronizing mechanism interconnects the star wheel applicators to synchronize the speed of rotation and to assure a uniform spray pattern.

15 Claims, 5 Drawing Sheets

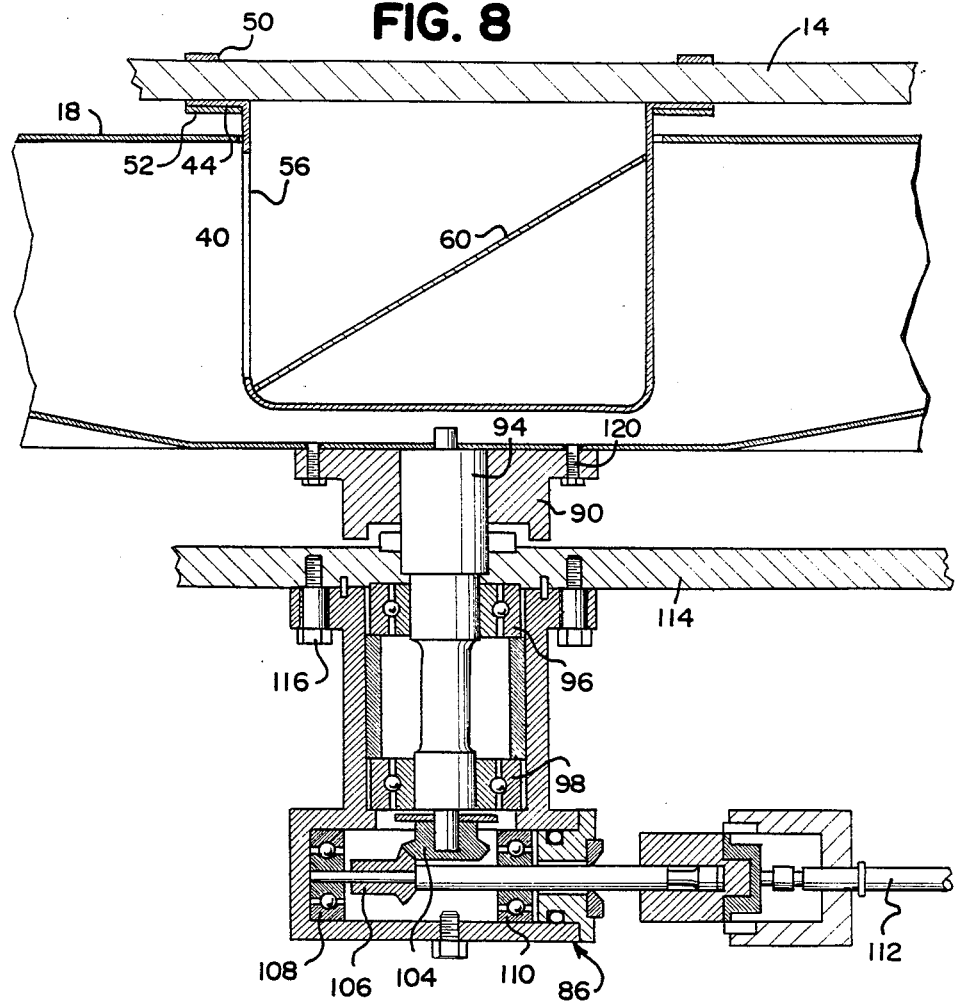
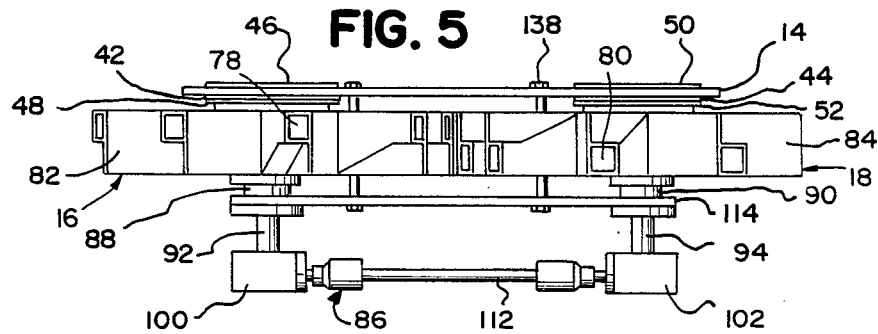

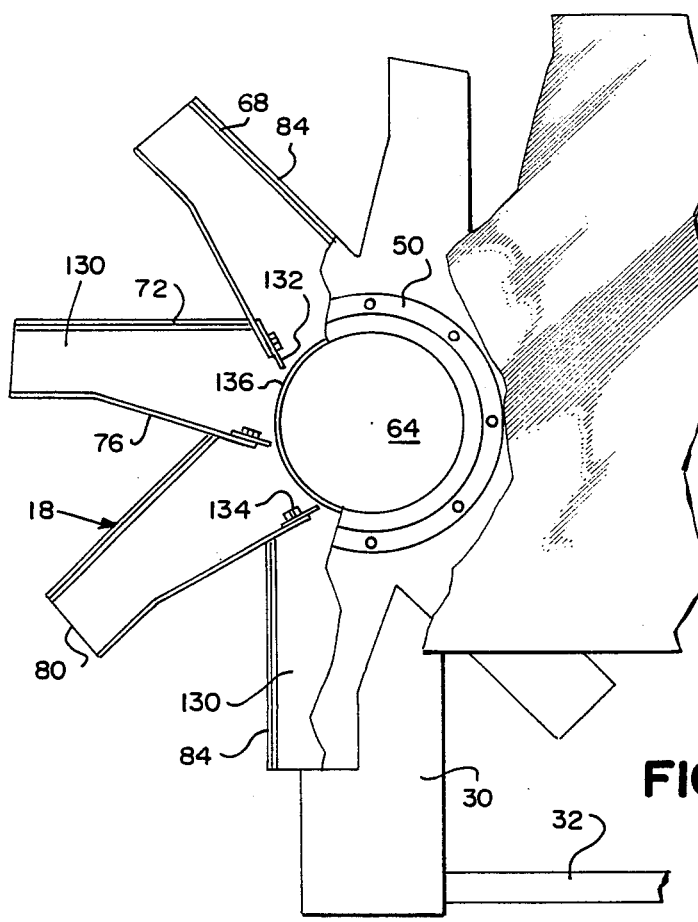
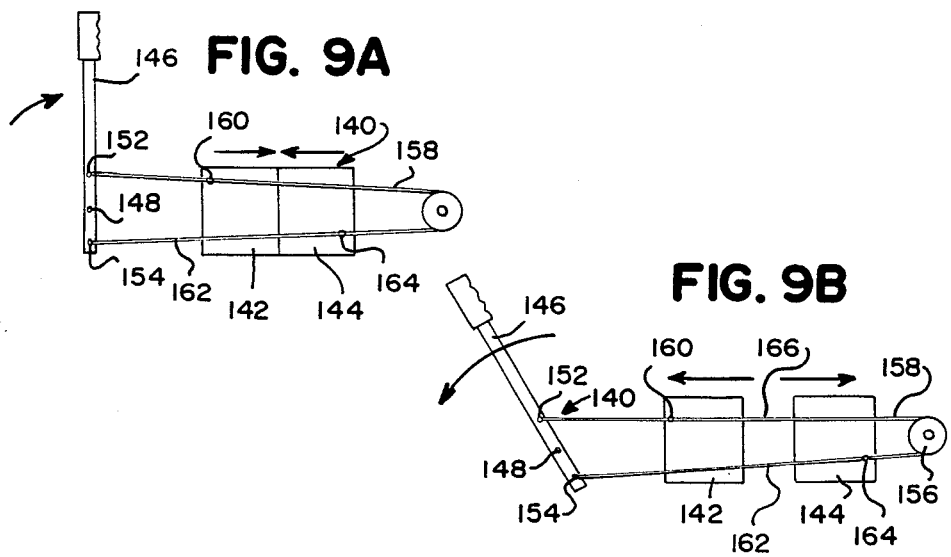

CENTRIFUGAL APPLICATING DEVICE

BACKGROUND OF THE INVENTION

1. Field of the Invention

This invention relates generally to dry material applicators suitable for airborne distribution of granular materials such as fertilizers, insecticides and fungicides, and more particularly, relates to a self-propelled centrifugal applicating device to be carried by an aircraft to apply the granular chemical materials by utilizing a pair of synchronized, air rotatable, star wheel spreaders.

2. Discussion of the Prior Art

There are numerous known applicator devices which are available for applying liquid and granular agricultural materials, such as herbicides, insecticides, fungicides, plant growth regulators and fertilizers by utilizing aircraft and other suitable agricultural material spreading equipment. Most of the prior art material spreaders were developed for use with liquid chemicals, and not too much prior work has been directed to the field of dry material applicators suitable for use with aircraft dispensing equipment.

In spraying dry or granular materials upon fields by employing aircraft, it is important that the product to be spread be uniform both in dimensions and in density to accomplish the best results, that is, the most uniform application pattern. So far as is known to the applicant, centrifugal applicating devices for dry materials have not heretofore been very widely employed, primarily due to the fact that such applicators inherently create turbulence in the sprayed product. Because of the turbulence, the prior available equipment could not develop maximum velocity in the dispersed particles. This then resulted in a random application of the dry agricultural materials, rather than in a controlled spray pattern. Cyclone type seeders are typical of the prior art dry material applicators. These devices usually function as three hundred and sixty degree applicators and all materials fed to the rotator were dispensed in turbulence due to the action of the rotating elements. Further, the known types of centrifugal prior art spreaders all had to be either manually turned or motor operated and no currently available self-propelled type of centrifugal spreader is known to the present applicant.

SUMMARY OF THE INVENTION

The present invention relates generally to applicators for applying granular agricultural chemicals from aircraft, and more particularly, is directed to a centrifugal applicating device incorporating a pair of synchronized, wind driven, star wheel spreaders incorporating construction features designed to control turbulence in the dry materials to relatively precisely control the application spray pattern.

The centrifugal applicating device of the present invention is designed to spread or apply dry agricultural products in granular form when using a conventional aircraft equipped with the usual type of agricultural chemical storage tank or hopper and suitable spray control equipment. The applicating device of the present invention features a pair of synchronized, rotary, star wheel spreaders which function to eliminate turbulence in the dry materials during the application process to control the application pattern. The centrifugal forces developed by the star wheel spreaders initially slow down the dry particles and control them to thereby eliminate turbulence. In this manner, the pattern of chemical application to a field can be relatively precisely controlled. The centrifugal applicating device of the present invention is an aerial applicator and includes means to increase efficiency of the application and to enhance safety and performance standards.

The applicating device comprises generally an upper plate which is hingedly connected to the dry material hopper or reservoir in the aircraft and serves as the hopper bottom. The upper plate is secured to the hopper in a hinged connection and includes a movable latch which can be controlled from the aircraft cockpit to permit dumping of the entire load in the event of an emergency. A pair of similar openings are provided in the upper plate to receive the dry granular materials from the aircraft hopper and to direct the granular material flow by gravity into a pair of flow control feed chutes. Sliding valves are controlled from the cockpit to simultaneously overfit the upper plate openings in a manner to precisely control the flow of granular materials in the full range from a complete off position to maximum applicator capacity.

Similar, but not identical, star wheel spreaders are simultaneously rotative about the respective feed chutes. The spreaders receive the granular material through feed chute openings in equal quantities and direct the granules into a plurality of circularly spaced applicator nozzles. Each nozzle is configured with one planar side which is enlarged to define a wind receiving paddle. Preferably, the wind receiving paddle can be fabricated as the planar side of each nozzle. In operation, the wind forces generated by the flying aircraft will impinge upon the paddles to cause rotation of the star wheel spreaders and without requiring motor assist of any type.

Preferably, the star wheel spreaders are synchronized for simultaneous operation and are provided with wind baffle means which may be utilized to closely control the rotative speed of the respective star wheel applicators about their respective feed chutes. Each nozzle terminates inwardly in an adjustable internal vane, which vanes may be adjusted relative to the feed chute opening to apply the same quantity of granular material into each nozzle as the wind drives the star wheel applicators in their rotative circuits.

It will be noted that the wind will drive the front side of the paddles for applicator rotative purposes and that the dry, granular materials will exit each nozzle off of the rear side of the paddles by centrifugal force. Due to the specific design of the applicator, the flow of material into the feed chutes is fully monitored and the speed of rotation of the star wheel spreaders can be accurately controlled. By employing the centrifugal applicating device of the present invention, it is now possible to spray a given area in approximately one-half the time required with presently available equipment, with considerably greater precision of application. Due to the configuration of the nozzles of the star wheel applicators, as the applicators rotate, the individual nozzle vanes will pick up the granular material and pack it against the rear of each nozzle in a manner to remove any turbulence which may be present in the granular materials.

The centrifugal forces generated by the rotary motion of the applicators will function to move the granular materials without turbulence forwardly along each nozzle for subsequent disbursement at the discharge opening. The applicators have been particularly designed so that each nozzle must rotate through an arc of one-hundred and eighty degrees before the material picked up at the rear of the nozzle can be sprayed. The granular material is therefore trapped within each nozzle through the first one-hundred and eighty degrees of rotation, thereby settling the turbulence in the granular materials. The discharge through the remaining one hundred and eighty degrees of rotation will impart maximum kinetic energy to the discharged materials at maximum uniform velocity, thereby increasing the swath width capability of the device without turbulence. By increasing the swath width and by eliminating turbulence, the entire applicating device can operate with greater efficiency and economy than any heretofore known type of rotary dry material spreading device.

It is therefore an object of the present invention to provide an improved centrifugal applicating device of the type set forth.

It is another object of the present invention to provide a novel centrifugal applicating device suitable for the application of granular agricultural chemicals which comprises a pair of rotating star wheel applicators, means to direct granular materials to the applicators in a quantity controlled manner, means to rotate the applicators without motors and means to eliminate turbulence in the granular materials prior to discharge from the rotary applicators.

It is another object of the present invention to provide a novel centrifugal applicating device comprising a hingedly connected upper plate having a pair of feed openings therein, feed chutes receiving granular agricultural chemicals through the upper plate openings, star wheel applicators rotatively secured about the feed chutes to receive the granular materials in measured quantities, means in the star wheel applicators to settle turbulence of the granular materials, the star wheel applicators comprising a plurality of nozzles and a plurality of paddles affixed to the nozzles, whereby wind forces impinging upon the paddles will cause simultaneous rotation of the star wheel applicators to generate centrifugal forces sufficient to discharge the granular materials through the nozzles with maximum kinetic energy and with minimum turbulence.

It is another object of the present invention to provide a novel centrifugal applicating device that is simple in design, easily controlled and adjusted when in use and trouble free in operation.

Other objects and a fuller understanding of the invention will be had by referring to the following description and claims of a preferred embodiment, taken in conjunction with the accompanying drawings, wherein like reference characters refer to similar parts throughout the several views and in which:

BRIEF DESCRIPTION OF THE DRAWINGS

FIG. 5 is an elevational view of the centrifugal applicating device looking from line 5—5 on FIG. 4.

FIG. 7 is an enlarged, partial, plan view of a star wheel applicator, partially broken away to disclose interior construction details.

FIG. 8 is an enlarged, sectional view taken along line 8—8 on FIG. 3, looking in the direction of the arrows.

FIGS. 9A and 9B are schematic views showing the wind baffle means respectively in closed and open positions.

DESCRIPTION OF THE PREFERRED EMBODIMENT OF THE INVENTION

Figure 1:
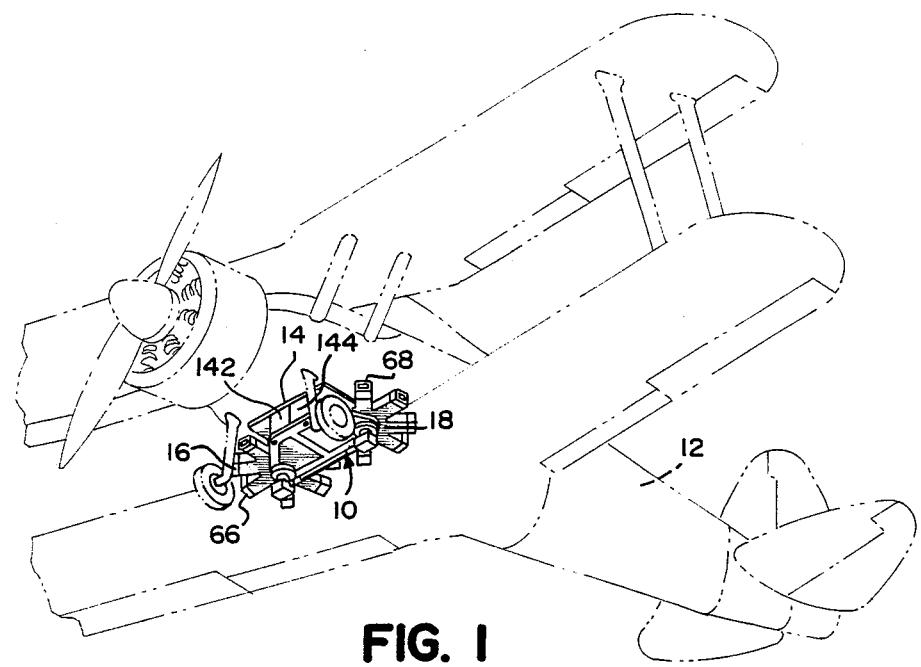
FIG. 1 is a perspective view showing the centrifugal applicating device of the present invention applied to an agricultural spray aircraft.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a centrifugal applicating device 10 constructed in accordance with the teachings of the present application in place upon a conventional agricultural spray type aircraft 12 in position for use. An upper applicator plate 14 is hingedly bottomly affixed to the aircraft fuselage in position to form the bottom construction of the usual chemical material reservoir or hopper (not shown) provided in the aircraft 12. A pair of star wheel applicators 16, 18 are rotatively affixed to the upper applicator plate 14 for product dispersal in the manner hereinafter more fully set forth.

Figure 3:
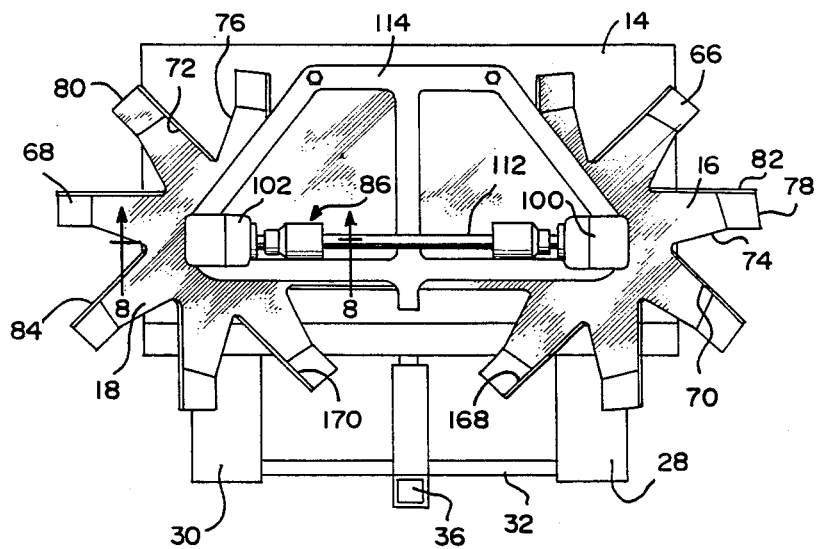
FIG. 3 is a bottom plan view of the centrifugal applicating device.
Figure 2:
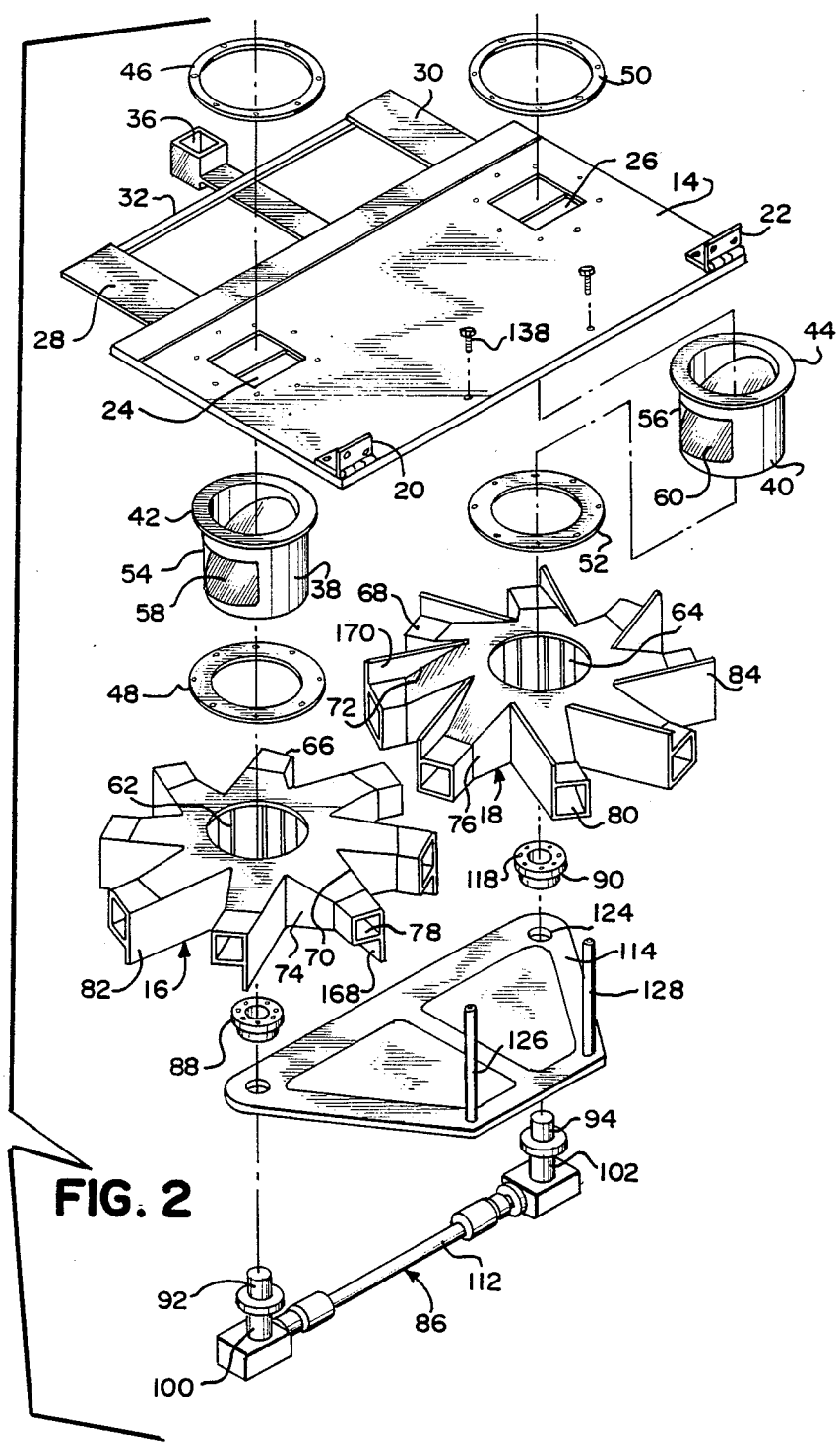
FIG. 2 is an enlarged, exploded, perspective view of the centrifugal applicating device.
Figure 4:
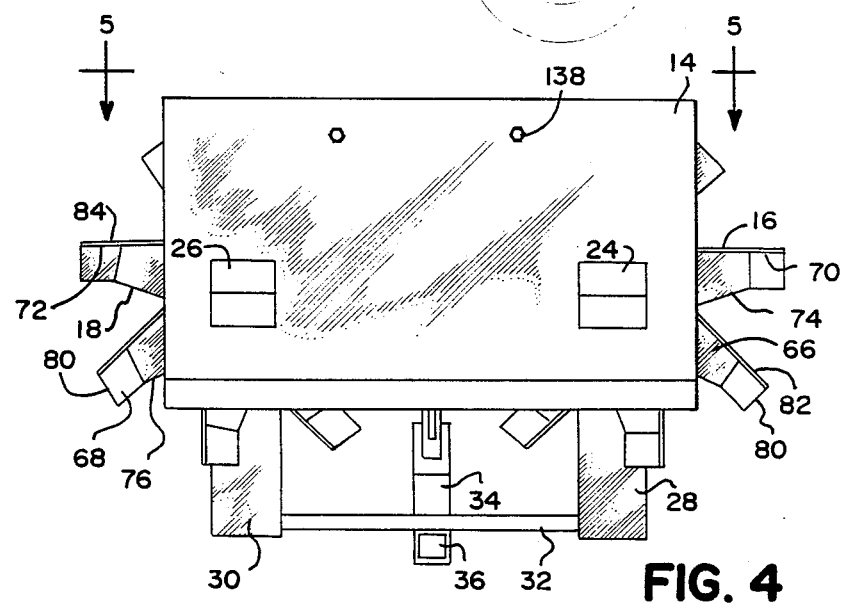
FIG. 4 is a top plan view of the centrifugal applicating device.

As best seen in FIGS. 2, 3 and 4, the upper applicator plate 14 includes forward, opposed hinges 20, 22 for hingedly connecting the applicating device 10 to the aircraft 12 in a manner to permit quick dumping of the granular materials from the aircraft in the event of emergency. A pair of spaced product inlet openings 24, 26 are provided in the upper plate 14 in communication with the interior of the aircraft dry material hopper (not shown) to facilitate gravity flow of the granular materials to the star wheel applicators 16, 18 as hereinafter more fully described. A pair of sliding, flat valves 28, 30 are arranged in sliding engagement along the bottom surface of the applicator plate 14 for complete or partial closing of the product inlet openings 24, 26.

As shown, the valves 28, 30 are yoked together by a transverse web 32 to which a central operating strut 34 is securely affixed. The operating strut 34 terminates rearwardly in a suitable opening 36 to receive therein the bottom bearing (not shown) of a conventional cockpit controlled pay lever (all not shown) to permit easy sliding longitudinal adjustment of the valves 28, 30 relative to the inlet openings, 24, 26 from the aircraft cockpit in known manner. By providing a loose fit between the bottom bearing of the pay lever and the operating strut opening 36, in the event that an emergency necessitates dumping the contents of the aircraft hopper, the applicating device 10 can can be caused to open about the hinges 20, 22. In such an event, the loose fit between the pay lever bearing (not shown) and the operating strut or link opening 36 will permit unrestricted separation of the parts to thereby not interfere at all with the product dumping operation.

Still referring to FIGS. 2, 3 and 4, a pair of similar feed chutes 38, 40 respectively underlie the product inlet openings 24, 26 and are formed with top flanges 42, 44 for mounting purposes. Upper and lower mounting rings 46, 48, 50, 52 are provided above and below the upper applicator plate 14 to secure the feed chutes 38, 40 below the inlet openings 24, 26 in known manner. It is noteworthy that each of the feed chutes 38, 40 is rotatively held by its respective lower mounting ring 48, 52 to thereby allow easy rotatable placement of the chute feed openings 54, 56 in a manner to facilitate maximum spraying efficiency.

Each feed chute 38, 40 is provided with an inclined floor or baffle 58, 60 to facilitate gravity feed of the granular agricultural chemicals from the aircraft hopper in a smooth transition zone without stranding any of granular material at the bottoms of the feed chutes 38, 40. The left and right star wheel applicators 16, 18 respectively overfit the feed chutes 38, 40 and are freely rotatable thereabout for granular material spreading purposes, as hereinafter more fully set forth.

As illustrated in FIGS. 2 and 7, each star wheel applicator 16, 18 is similarly formed and comprises generally a wheel-like body comprising a central opening 62, 64 of suitable diameter to overfit a respective feed chute 38, 40. Each star wheel applicator body is configured to provide a plurality of outwardly projecting, non-radial, elongated, hollow nozzles 66, 68 wherein each nozzle is in fluid communication with a respective central opening 62, 64. As shown, the nozzles 66, 68 comprise one planar side 70, 72 and one angularly inclined side 74, 76, which sides converge to define the respective constricted outlet openings 78, 80. As best seen in FIGS. 2, 3, 4 and 7, each of the planar sides 70, 72 of the plurality of star wheel nozzles 66, 68 is enlarged to form a wind contacting paddle 82, 84.

The paddles preferably are rectangular in configuration with the vertical dimension larger than the height of the nozzles 66, 68 for more efficient wind driven operation. As illustrated in FIGS. 2 and 5, the paddles 82 of one star wheel applicator 16 extend downwardly from the respective nozzles 66 and the paddles 84 extend upwardly from the respective nozzles 68 of the other star wheel applicator 18. This construction provides the necessary clearance for the spray patterns generated by each of the star wheel applicators 16, 18 without interference when the device is in operation. As best seen in FIG. 5, the nozzle openings of one star wheel applicator 16 are positioned at an elevation above the nozzle openings of the other star wheel applicator 18 so that the dry material spray patterns generated by each of the star wheel applicators will not inwardly interfere in any overlap spray pattern.

Referring now to FIGS. 2 and 8, it will be seen that the star wheel applicators 16, 18 are equipped with synchronizing means to cause the applicators to rotate at uniform velocity in equal but opposite directions. Each star wheel applicator is provided with a bottomly affixed hub 88, 90 to which is respectively secured a vertical control shaft 92, 94 for rotative speed control purposes. The shafts 92, 94 are journaled within upper and lower enclosed bearings 96, 98 which are maintained within a suitable housing 100, 102 in known manner. Bevel gears 104, 106 and bearings 108, 110 transmit vertical rotative movement of the control shafts 92, 94 to horizontal rotative movement of the interconnecting control shaft 112 to thereby assure positive linkage between the star wheel applicators 16, 18 for precise, synchronized, rotative control of the star wheel applicators.

Figure 6:
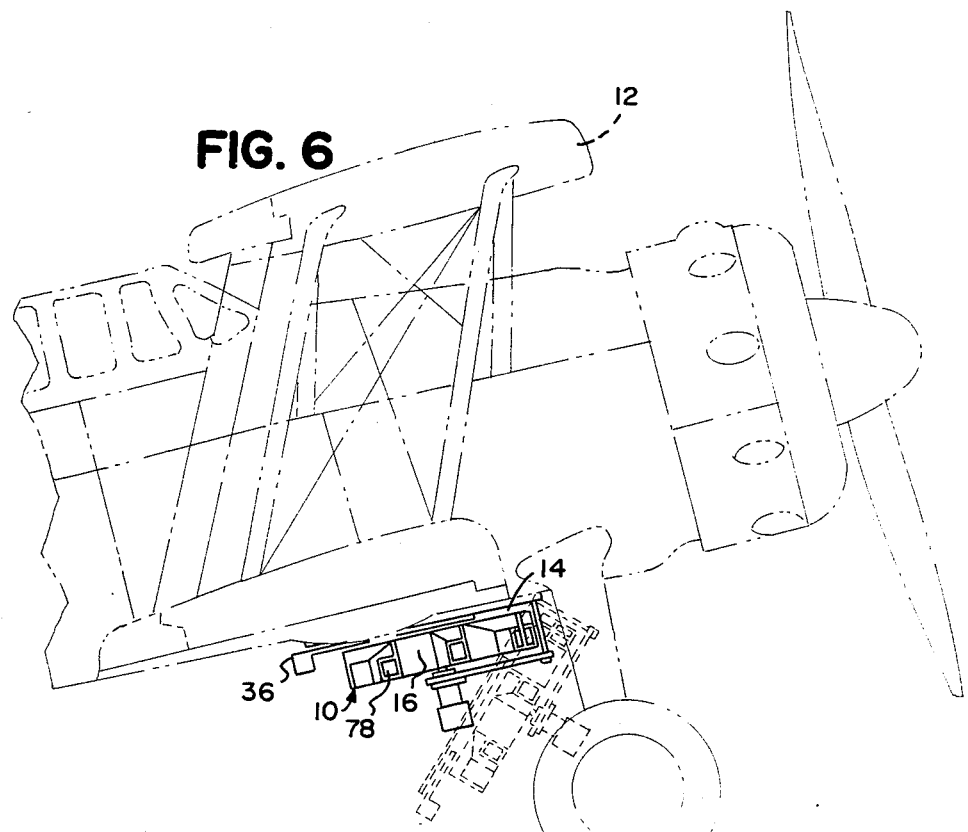
FIG. 6 is a side elevational view showing the centrifugal applicating device in full lines in operating position affixed to an agricultural aircraft and further showing the device in phantom lines in the dumping position in the event of emergency.

Still referring to FIGS. 2 and 8, a lower open frame member 114 secures the left and right housings 100, 102 in known manner, for example, by employing a plurality of machine bolts 116 which threadedly engage the threaded openings 118 provided in the lower frame member 114. A second plurality of fasteners 120 insert through openings the bottom hub 88, 90 to affix the control shafts 92, 94 to the bottoms of the respective star wheel applicators 116, 118 whereby the control shafts 92, 94 will be rotated when the star wheel applicators are rotated. Suitable openings 124 are provided in the lower frame member 114 to pass the control shafts 92, 94 therethrough. Spacers 126, 128 and suitable elongated bolts (not shown) secure the lower frame member 114 to the upper applicator plate 14 in secure manner to permit the entire assembled device 110 to pivot as an unit about the hinges 20, 22 in the manner illustrated in phantom lines in FIG. 6.

Referring now to FIG. 2 and to FIG. 7, it will be seen that each of the nozzles 66, 68 is formed with as hollow interior 130 and is laterally defined by paddle 82, 84 and an angularly inclined side 74, 76. The angularly inclined sides 74, 76 of the nozzles each terminate interiorly in a connection to an adjustable, vertical vane 132 having a conventional adjustment means 134, such as a bolt and an elongated slot. The respective vanes 132 are movable toward or away from the outer periphery 136 of a feed chute 38, 40 to precisely control the amount of granular agricultural material that is supplied by the respective feed chutes 38, 40 through the feed chute openings 54, 56 to each nozzle 66, 68 of each star wheel applicator 16, 18. The internal vanes 132 are employed to meter and to apply exactly the same amount of granular material into each enclosed nozzle as the star wheel applicator 16, 18 are rotated by the wind forces impinging against the respective wind paddles 82, 84. Preferably, the feed chutes 38, 40 are rotatively secured to the upper applicator plate 14 by employing the upper and lower mounting ring pairs 46, 48 and 50, 52 in a manner whereby the feed chute openings 54, 56 can be rotatively adjusted to precisely control the application quantities. If desired, a rotary baffle (not illustrated) can be applied over the feed chute openings 54, 56 to vary the size of the feed chute openings in an easy adjustment whenever such variation may be desired.

As best seen in FIGS. **5, 9*a* and 9*b*, wind baffle means 140 are provided in front of the star wheel applicators 16, 18 to thereby provide a readily adjustable means for varying the quantity of wind forces which may impinge upon the plurality of star wheel applicator paddles 82, 84. As illustrated, the wind baffle means may comprise a pair of similar, oppositely horizontally movable baffle plates 142, 144. The baffle plates 142, 144 are preferably movable within horizontal tracks (not illustrated) which can be affixed directly to the upper applicator plate 14 and to the lower frame member 114 to permit the baffle plates 142, 144 to horizontally slide directly in front of the star wheel applicators 16, 18**.

In a preferred embodiment, an operating lever 146 is positioned within the aircraft cockpit and is pivotal about a lower pivot 148 in known manner. An operating cable 150 has its ends secured to the operating lever 146 at an upper connection 152 and a lower connection 154, which connections are respectively spaced above and below the pivot 148 in a manner to cause longitudinal movement of the operating cable 150 about a pulley 156 when the operating lever 146 is pivotally moved. As shown, one baffle plate 142 connects to the upper cable run 158 in an upper connection 160 and the other baffle plate 144 connects to the lower cable run 162 in a lower connection 164. Accordingly, as the operating lever 146 is forwarded or rearwardly moved about its pivotal connection 148, the baffle plates 142, 144 can be caused to either slide together as illustrated in FIG. 9a or to slide apart as illustrated in FIG. 9b.

In operation, with the baffle plates urged together in the manner illustrated in FIG. 9a, all wind forces will be directed about the baffle plates 142, 144 and will outwardly impinge upon the paddles 82, 84 to cause rotary, synchronized spinning of the star wheel applicators, 16, 18 at maximum speed. As illustrated, the wind will drive the front sides of the respective paddles 82, 84. When it is desired to vary the speed of star wheel applicator rotation, or perhaps to prevent rotation of the paddles entirely, the baffle plate operating lever 146 can be pivotally functioned to cause the baffle plates 142, 144 to horizontally slide apart within the upper and lower tracks (not shown) to open a spacing 166 therebetween. Wind caused by the forward movement of the aircraft 12 and by the aircraft propeller can then pass through the space 166 to partially impinge upon exposed portions of the rear sides 168, 170 of the paddles 82, 84 to cause oppositely directed forces to act upon the star wheel applicators, 16, 18. By controlling the position of the operating lever 146, the spacing 166 can be so varied as to precisely control the speed of rotation of the star wheel applicator 16, 18 between maximum rotative speed position (FIG. 9a) to a substantially stalled or force equalized position (FIG. 9b).

In use, the feed chutes 38, 40 are rotatively adjusted relative to the upper applicator plate 14 to position the feed chute openings 54, 56 in a generally rearwardly facing direction. The granular materials will feed by gravity from the plane hopper (not shown) through the product inlet openings 24, 26 and into the feed chutes 38, 40. The granular material then will be directed by the slanted or inclined floors 58, 60 to be equally picked up by the respective metering vanes 132 for the application of equal amounts of material to be sprayed into the hollow interiors 130 of each of the nozzles 66, 68 as the star wheel applicators 16, 18 are being rotatively driven by the wind forces acting upon the exposed faces of the respective paddles 82, 84. The feed chute openings 54, 56 are so positioned that each vane 132 in turn will pick up a metered quantity of the dry material and pack it against the rear of each nozzle. The packing of the dry material at the nozzle rear while rotating the nozzle functions to remove all turbulence from the material to be sprayed.

The centrifugal forces generated by rotative movement of the star wheel applicators 16, 18 will cause the dry agricultural materials to move forwardly along the straight walls of the respective nozzles for disbursement at the plurality of constricted discharge openings 78, 80. The feed chute openings 54, 56 are so positioned that each nozzle 66, 68 must be rotated through one hundred and eighty degrees before anything can be sprayed from that particular nozzle. In this manner, the dry material is trapped within each nozzle during approximately one-half of each rotation cycle to settle all turbulence. Spraying of the dry material through the nozzle openings 78, 80 will then occur through the remaining part of the complete three hundred and sixty degree rotary movement of the nozzles with all turbulence settled during the movement through the nozzle. The dry agricultural chemical particles will then be imparted maximum uniform velocity through the remaining one hundred and eighty degree spray portion of the rotational cycle. This settling of the turbulence of the particles within each nozzle during the first one hundred and eighty degree degrees of nozzle rotation imparts maximum kinetic energy to the granular materials to thereby increase the swath width capability of the apparatus by eliminating turbulence. By increasing swath width, the entire centrifugal applicating device 10 can operate with greater efficiency and greater economy than any heretofore known type of dry material rotary spray apparatus.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather only by the scope of the claims appended hereto.

What is claimed is:

1. An applicating device for spreading granular materials from a storage hopper mounted in an aircraft comprising an upper plate secured to the aircraft below the storage hopper, the upper plate being provided with a pair of spaced material inlet openings to receive the granular materials from the storage hopper therethrough, a pair of star wheel applicators rotatively secured to the upper plate, each star wheel applicator being positioned respectively below a material inlet opening, the star wheel applicators receiving portions of the granular materials from the storage hopper through the material inlet openings, the star wheel applicators each comprising a central opening and a plurality circumferentially spaced hollow nozzles leading outwardly from the central opening, a plurality of planar, enlarged paddles, each paddle being respectively affixed to a side of a nozzle to receive wind forces generated by forward movement of the aircraft to cause rotation movement of the star wheel applicators, each paddle being integral with and directly connected to its associated nozzle;

whereby the granular materials will be spread in a circular pattern by centrifugal force through the nozzles of each star wheel applicator.

2. The applicating device of claim 1 and a pair of feed chutes supported from the upper plate below the material inlet openings.

3. The applicating device of claim 2 wherein the feed chutes are generally cylindrical in configuration having cylindrical sidewalls and feed chute openings provided in the sidewalls, the feed chute openings extending through an arc of less than one hundred and eighty degrees.

4. The applicating device of claim 3 wherein the feed chutes comprise slanted floors, the floors being slanted in a direction to direct the granular materials through the feed chute openings.

5. The applicating device of claim 1 and means to synchronize the rotation of the star wheel applicators to cause the star wheel applicators to rotate at the same speed.

6. The applicating device of claim 5 wherein the means to synchronize comprises a control shaft interconnected between the star wheel applicators.

7. An applicating device for spreading granular materials from an aircraft comprising
   an upper plate secured to the aircraft, the upper plate being provided with a pair of spaced, material inlet openings,
   a pair of star wheel applicators rotatively secured to the upper plate, each star wheel applicator being positioned respectively below a material inlet opening,
   the star wheel applicators receiving portions of the granular materials from the aircraft through the material inlet openings,
   the star wheel applicators each comprising a central opening and a plurality circumferentially spaced hollow nozzles leading outwardly from the central opening,
   at least some of the nozzle being defined on one side by a planar, enlarged paddle to receive wind forces generated by forward movement of the aircraft to cause rotative movement of the star wheel applicators; and
   wind baffle means movably secured to the upper plate, the wind baffle means being positioned in front of portions of the star wheel applicators;
   whereby the granular materials will be spread in a circular pattern by centrifugal force through the nozzles of each star wheel applicator.

8. The applicating device of claim 7 wherein the wind baffle means comprises a pair of baffle plates and means to move the plates between a first position wherein there is no spacing between the baffle plates to a second position wherein there is a space between the baffle plates.

9. The applicating device of claim 8 and adjustable vanes in the star wheel applicators to vary the flow of granular materials into the nozzles.

10. The applicating device of claim 9 wherein the adjustable vanes are positioned in the nozzles at their interface with the said central opening.

11. A centrifugal applicating device for applying granular materials comprising an upper plate having a pair of feed openings therein, feed chutes suspended from the upper plate below the feed openings for receiving granular agricultural materials through the feed openings, star wheel applicators rotatively secured about the feeds chutes to receive the granular materials in measured quantities from the feed chutes, means in the star wheel applicators to settle turbulence of the granular materials, the star wheel applicators comprising a plurality of nozzles and a plurality of paddles affixed to the nozzles, the star wheel applicators each comprising a central opening overfitting a feed chute, the nozzles terminating radially inwardly in fluid communication with the central opening, and
   adjusting vanes in the nozzles at the interface between each nozzle and the star wheel applicator central opening to adjust the quantity of flow of granular materials into each nozzle,
   whereby wind forces impinging upon the paddles will cause simultaneous rotation of the star wheel applicators to generate centrifugal forces sufficient to discharge the granular material through the nozzles with maximum kinetic energy and with minimum turbulence.

12. The centrifugal applicating device of claim 11 wherein the nozzles are formed with one planar side and wherein the paddles comprise the planar sides.

13. The centrifugal applicating device of claim 11 and valves positioned on the upper plate to control the follow of granular materials through the feed openings.

14. The centrifugal applicating device of claim 11 and wind baffle means movably secured to the upper plate, the wind baffle means being positioned in front of portions of the star wheel applicators.

15. The centrifugal applicating device of claim 14 wherein the wind baffle means comprises a pair of baffle plates and means to move the baffle plates between a first position wherein there is no spacing between the baffle plates to a second position wherein there is a space between the baffles plates, whereby the wind forces impinging upon the paddles can be varied to vary the speed of rotation of the star wheel applicators.

* * * * *